(12) United States Patent
Lakshmanan

(10) Patent No.: US 10,902,197 B1
(45) Date of Patent: Jan. 26, 2021

(54) VOCABULARY DETERMINATION AND VOCABULARY-BASED CONTENT RECOMMENDATIONS

(71) Applicant: Audible, Inc., Newark, NJ (US)

(72) Inventor: Geetika Tewari Lakshmanan, Winchester, MA (US)

(73) Assignee: Audible, Inc, Newark, NJ (US)

(*) Notice: Subject to any disclaimer, the term of this patent is extended or adjusted under 35 U.S.C. 154(b) by 526 days.

(21) Appl. No.: 14/673,627

(22) Filed: Mar. 30, 2015

(51) Int. Cl.
*G06F 40/205* (2020.01)

(52) U.S. Cl.
CPC .................. *G06F 40/205* (2020.01)

(58) Field of Classification Search
None
See application file for complete search history.

(56) References Cited

U.S. PATENT DOCUMENTS

| | | | | |
|---|---|---|---|---|
| 2012/0023006 A1* | 1/2012 | Roser | .................. | G06Q 40/025 705/38 |
| 2014/0188830 A1* | 7/2014 | deVille | ............... | G06F 17/3071 707/706 |
| 2014/0280536 A1* | 9/2014 | Beerse | .................. | H04L 67/22 709/204 |
| 2015/0019204 A1* | 1/2015 | Simard | ............... | G06F 17/2785 704/9 |
| 2016/0188702 A1* | 6/2016 | Lee-Goldman | ............ | G06F 17/30675 707/749 |

* cited by examiner

*Primary Examiner* — Richa Mishra
(74) *Attorney, Agent, or Firm* — Knobbe, Martens, Olson & Bear, LLP

(57) ABSTRACT

Features are disclosed for determining the vocabulary of a user and identifying content items appropriate for the user based on the user's personal vocabulary. The user's vocabulary can be determined by analyzing user-generated textual items. Based on the analysis of such user-generated textual items, a list of words used frequently by the user in the user's own writings can be identified as being in the user's vocabulary. The list of words in the user's vocabulary can be compared to the words in various content items to determine a degree to which the words used in the content are in the user's vocabulary. Content can then be recommended or otherwise determined to be appropriate for the user's vocabulary, identified as challenging, too difficult, or too easy, etc.

21 Claims, 6 Drawing Sheets

US 10,902,197 B1

VOCABULARY DETERMINATION AND VOCABULARY-BASED CONTENT RECOMMENDATIONS

BACKGROUND

Generally described, computing devices utilize a communication network, or a series of communication networks, to exchange data. Companies and organizations operate computer networks that interconnect a number of computing devices to support operations or provide services to third parties. In some instances, computing networks may be used to transmit items of digital content to users for consumption on a user's computing device. For example, a user's computing device may visually convey items of content such as animations, electronic books, electronic periodicals, movies, television programs, multimedia content and portions thereof on an electronic screen or touchscreen. A user's computing devices may also direct audible output through headphones or speakers to convey items of audible content such as audiobooks, songs, movies, television programs, multimedia content and portions thereof.

Digital content may be utilized by users in a variety of contexts. For example, users desiring to learn a language may utilize digital content in that language to increase the user's exposure to the language, with the goal of increasing the user's fluency. In language learning applications, the difficulty of a content item (e.g., due to the specific vocabulary used or the nature of presentation of the language) can greatly affect the ability of a user to comprehend the item. In order to provide content to a variety of different users with a variety of different vocabularies, some language learning applications provide different levels of content, such as "beginner," "intermediate," "advanced," and the like. Users then self-identify or otherwise select content at an appropriate level.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
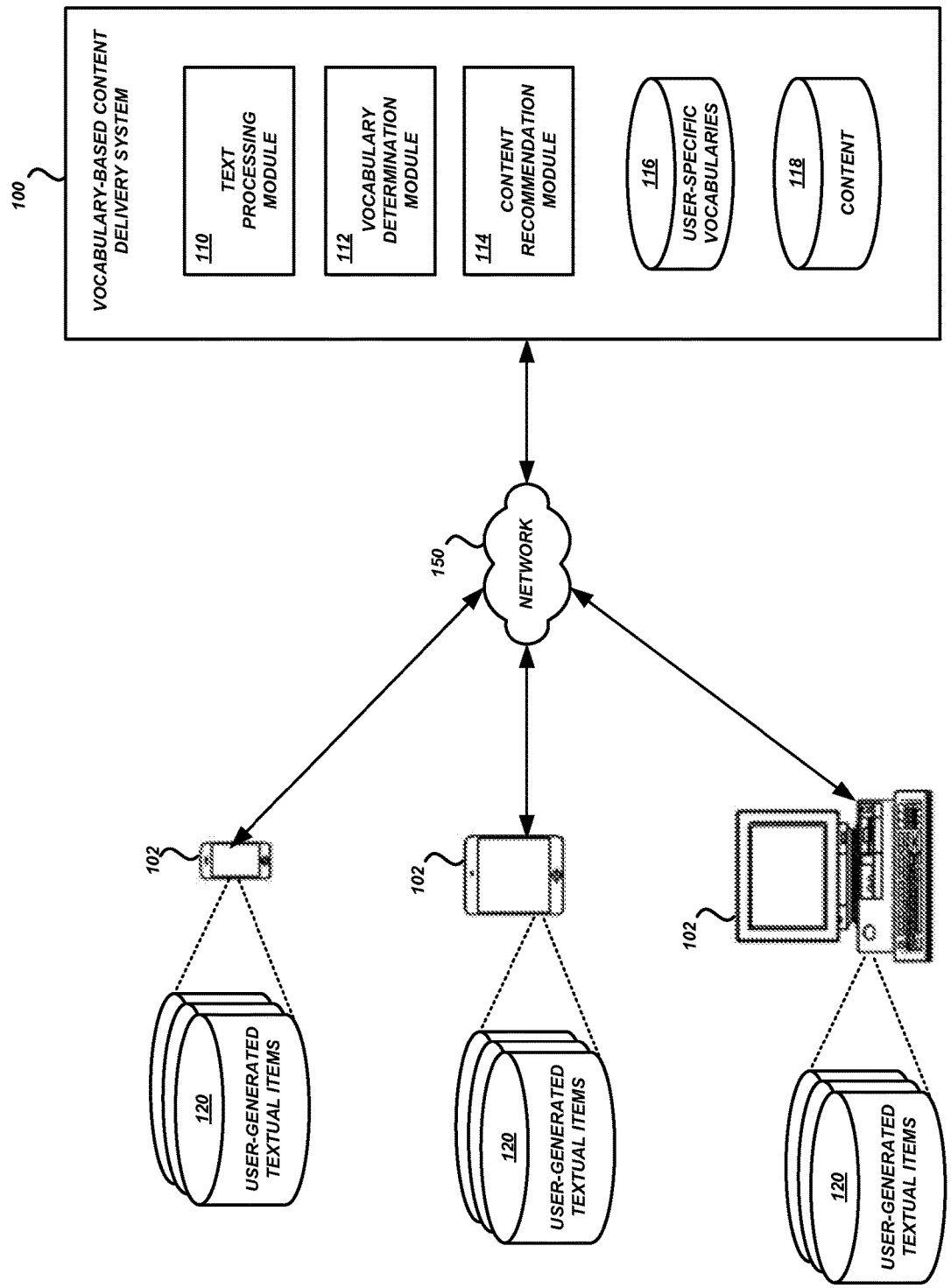
FIG. 1 is a block diagram of an illustrative network environment including a vocabulary-based content delivery system and multiple user computing devices according to some embodiments.

The present disclosure is directed to determining the vocabulary of a user and identifying content items appropriate for the user based on the user's personal vocabulary. The user's vocabulary can be determined by analyzing textual items generated by the user, including user-generated textual communications such as emails, text messages, social network messages and posts, weblog ("blog") and microblog posts, and the like. Based on the analysis of such user-generated textual items, a list of words used frequently by the user in the user's own writings can be identified as being in the user's vocabulary. The list of words in the user's vocabulary can be compared to the words in various content items (e.g., books, magazines, and other text-based content whether in printed or electronic form; audio books, movies, and other audio or multimedia content for which a transcript or word list is available) to determine a degree to which the words used in the content are in the user's vocabulary. Content can then be recommended or otherwise determined to be appropriate for the user's vocabulary, identified as too difficult, identified as too easy, etc. In this way, the user may access content appropriate for the user's personal vocabulary instead of relying upon generalized vocabulary levels that may be applied to content (e.g., beginner/intermediate/advanced/etc.).

Some services use generalized assumptions about the vocabularies of users. For example, some systems rely on the New General Service List ("NGSL") of words to determine the difficulty of a text. In such systems, the NGSL serves as a benchmark or assumption of what an English speaker's vocabulary should be. The systems determine the difficulty of a text based on the assumption that texts with a lower percentage of words covered by the NGSL are more difficult than texts with a higher percentage of words covered by the NGSL. However, the NGSL does not account for user-specific differences in vocabulary size, coverage, or level. Some services account for user-specific differences in vocabulary by soliciting users' answers to questionnaires, tests, and the like to obtain information about individual users' vocabularies. However, such tests may be time consuming or otherwise inconvenient for users who wish to obtain the benefits of content recommendations based on user-specific vocabularies.

Some aspects of the present disclosure relate to determining the words in a particular user's vocabulary by analyzing textual items generated by the user, including emails, text messages, social network messages and posts, blog and microblog posts, network searches, information entered on network pages, word processing documents, and the like. User-generated textual items can be processed to extract the words actually used by the user (e.g., typed or selected by the user). For example, emails can be processed to remove metadata, header information, and messages to which the user is responding or which the user is forwarding. The processed information can be normalized to, e.g., remove certain punctuation marks, expand contractions and abbreviations, correct misspellings, adjust for capitalization, and the like, thus producing a collection of words used by the user. In some embodiments, the normalized information can be further processed to group the different inflected forms of words together in a process known as lemmatization. For example, a system may lemmatize text by considering the different inflected forms of a particular word or "lemma" in the text to each be an instance of the lemma rather than an instance of a separate word corresponding to one of the inflected forms. In this example, the lemma is the basic form or canonical form of a word, and use of different inflected forms of the lemma may be considered further evidence that the user is likely to know the meaning of the lemma. Illustratively, the words "walk," "walked," "walks," and "walking" may each appear in a text and may each be replaced by or otherwise counted as four instances of the lemma "walk" rather than a single instance of each of "walk," "walked," "walks," and "walking". The system can determine the usage frequency of individual words in the processed user-generated textual items by counting the instances of each individual word in the processed text. The most frequently used words, either overall or by the percentage of user-generated textual items in which the words appear, may be identified as being in the user's current vocabulary. In some embodiments, the k most-frequently used words may be identified, where k is some positive predetermined or dynamically-determined integer.

Additional aspects of the present disclosure relate to recommending content to a user or otherwise determining whether content is appropriate for a user based on the user's personal vocabulary. The system may have access to complete lists of words in individual content items, such as books, magazines, and the like. The system can determine whether to recommend a particular content item to a user, or to otherwise indicate a degree of difficulty or appropriateness for a user, by comparing the list of words in the content item to the list of words in the user's personal vocabulary. In this way, the system can determine the degree to which the user's personal vocabulary "covers" the content item (e.g., the degree to which the words in the content item are also in the user's personal vocabulary). Generally, content items with a larger number or percentage of words that are also in a user's vocabulary will be easier for a user to understand than content items with a lower number or percentage of words that are in the user's vocabulary. In some embodiments, thresholds of vocabulary coverage can be used to indicate the degree of difficulty for a particular content item or whether to recommend particular content item. For example, if a user's vocabulary covers 70% of the words in a particular content item, the content item may be recommended to a user or identified as having an appropriate degree of difficulty for the user. If a user's vocabulary covers less than 60% of the words in a content item, the content item may be identified as having a high degree of difficulty for the user, while content items for which a user's vocabulary covers greater than 90% of the words may be identified as having a low degree of difficulty for the user. The thresholds described herein are illustratively only, and are not intended to be limiting. In some embodiments, different thresholds may be used, or thresholds may be dynamically determined based on various factors, such as the user's level of interest in the genre of the content item, user-provided feedback about similar content items or content items for which the user's vocabulary covers a similar amount or percentage of words, etc.

Further aspects of the present disclosure relate to updating the user's vocabulary and/or the thresholds used to determine the degree of difficulty for the user. In some embodiments, the user may be quizzed about the user's comprehension of the content item, words appearing in the content item that were not previously in the user's vocabulary, etc. The user's vocabulary can then be updated to include some or all words in the content item based on the user's feedback, the fact that the user consumed the content item, etc. In other embodiments, the user may be solicited for feedback regarding a content item that was recommended by the system or for which the system determined a degree of difficulty for the user based on the user's personal vocabulary. If the user indicates that the content item was more or less difficult that the system determined, then the system may update the thresholds for the user such that future determinations may be more in line with the difficulty perceived by the user.

Still further aspects of the present disclosure relate to obtaining user-generated textual items. In some embodiments, the user-generated textual items may be obtained by an application programming interface ("API") or application software executing on a user's computing device, such as a smart phone. For example, a user may wish to obtain content recommendations and difficulty determinations tailored for the user's own vocabulary without being required to first answer a questionnaire, take a test, or otherwise actively demonstrate a current vocabulary. The user may download application software from, e.g., a vocabulary-based content delivery system. The application software may prompt the user for permission to obtain access to the user's communications and other textual items stored on or otherwise accessible via the smart phone. The application may then obtain, e.g., the n most recent user-generated textual items (where n is some integer), all user-generated textual items created after a certain date or within a certain date range, etc. The obtained textual items can be transmitted to the vocabulary-based content delivery system to be used in determining the user's personal vocabulary. In some embodiments, the user's personal vocabulary may be determined on the user's own computing device, such as by the application software executing on the smart phone, rather than at a remote server system. In some embodiments, the user may select and provide individual textual items reflective of the user's current vocabulary instead of allowing an application to obtain communications and other textual items on its own. For example, a user may provide school papers, non-confidential documents created at work, etc. In this way, the user can have greater control over the information used to determine the user's personal vocabulary, while still obtaining the benefit of automatic vocabulary determination without actively participating in vocabulary tests.

Although aspects of the embodiments described in the disclosure will focus, for the purpose of illustration, on specific examples of content items and user-generated textual items, one skilled in the art will appreciate that the techniques disclosed herein may be applied to any number of services, process, or applications. In some embodiments, recordings of user utterances may be used to determine a user-specific vocabulary instead of, or in addition to, user-generated textual items. For example, a speech recognition service may generate transcripts of user utterances, and those transcripts may be processed to determine the user's vocabulary. In other embodiments, the non-textual content may be recommended to users based on the user-specific vocabulary. For example, multimedia presentations, television shows, news broadcasts, on-demand broadcasts ("podcasts"), video games, and the like may be analyzed to determine whether they are appropriate for individual users based on the vocabularies of the individual users. Various aspects of the disclosure will now be described with regard to certain examples and embodiments, which are intended to illustrate but not limit the disclosure.

Example Vocabulary-Based Content Delivery Environment

FIG. 1 shows an example network environment in which features of the present disclosure can be implemented according to some embodiments. The example network environment includes a vocabulary-based content delivery system 100 (also referred to herein simply as a "content delivery system" for convenience) in communication with various user devices 102 via a communication network 150. The network 150 may be a publicly-accessible network (such as the Internet) of linked networks, possibly operated by various distinct parties. In other embodiments, the network 150 may include a private network, personal area network, local area network, wide area network, cable network, satellite network, cellular telephone network, etc., or combination thereof, each with or without access to and/or from the Internet.

The content delivery system 100 can be a computing system configured to manage determination of user-specific vocabularies and recommendation of content based upon the determined vocabularies. In some embodiments, the content delivery system 100 can be a server or group of servers that may be accessed via the network 150. The content delivery system 100 can include a number of components to provide various features described herein, such as a text processing module 110 to obtain user-generated textual items and process the text for use in determining user-specific vocabularies, a vocabulary determination module 112 to determine vocabularies for individual users, and a content recommendation module 114 to determine which content items are appropriate for individual users or otherwise determine the difficulty of content items for individual users given their current vocabularies. The content delivery system 100 may also include various data stores, such as a user-specific vocabularies data store 116 to store the vocabularies determined for individual users (e.g., lists of the top k words used by individual users in their own user-generated textual items) and a content data store 118 to store content and information regarding the content (e.g., lists of words used in individual content items, frequencies of word use, etc.).

The content delivery system 100 may be a single computing device, or it may include multiple distinct computing devices, such as computer servers, logically or physically grouped together to collectively operate as a server system. The components of the content delivery system 100 can each be implemented as hardware, such as a server computing device, or as a combination of hardware and software. In addition, the components of the content delivery system 100 can be combined on one server computing device or separated individually or into groups on several server computing devices. In some embodiments, the content delivery system 100 may include additional or fewer components than illustrated in FIG. 1. In some embodiments, the features and services provided by the content delivery system 100 may be implemented as web services consumable via a communication network 150. In further embodiments, the content delivery system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user computing devices 102 can correspond to a wide variety of computing devices, including desktop computing devices, laptop computing devices, terminal devices, mobile phones, tablet computing devices, media players, set-top boxes, televisions (e.g., smart TVs), wearable computing devices (e.g., smart watches, smart eyewear, etc.), and various other electronic computing devices and appliances having one or more computer processors, computer-readable memories, and network connections. As described in greater detail below, a user of a user computing device 102 may use various applications to generate textual items 120, including text messages, instant messages, emails, social network messages and posts, weblog ("blog") and microblog posts, word processing documents, and the like. The user-generated textual items 120 may be stored in persistent non-transitory computer-readable memories, such as hard disks and/or flash memories, integrated into or coupled to the user devices 102. Alternatively, or in addition, the user-generated textual items may be stored at one or more network locations, such as a "cloud" based storage system, a social networking service, etc.

Determination and Usage of User-Specific Vocabularies

Figure 2:
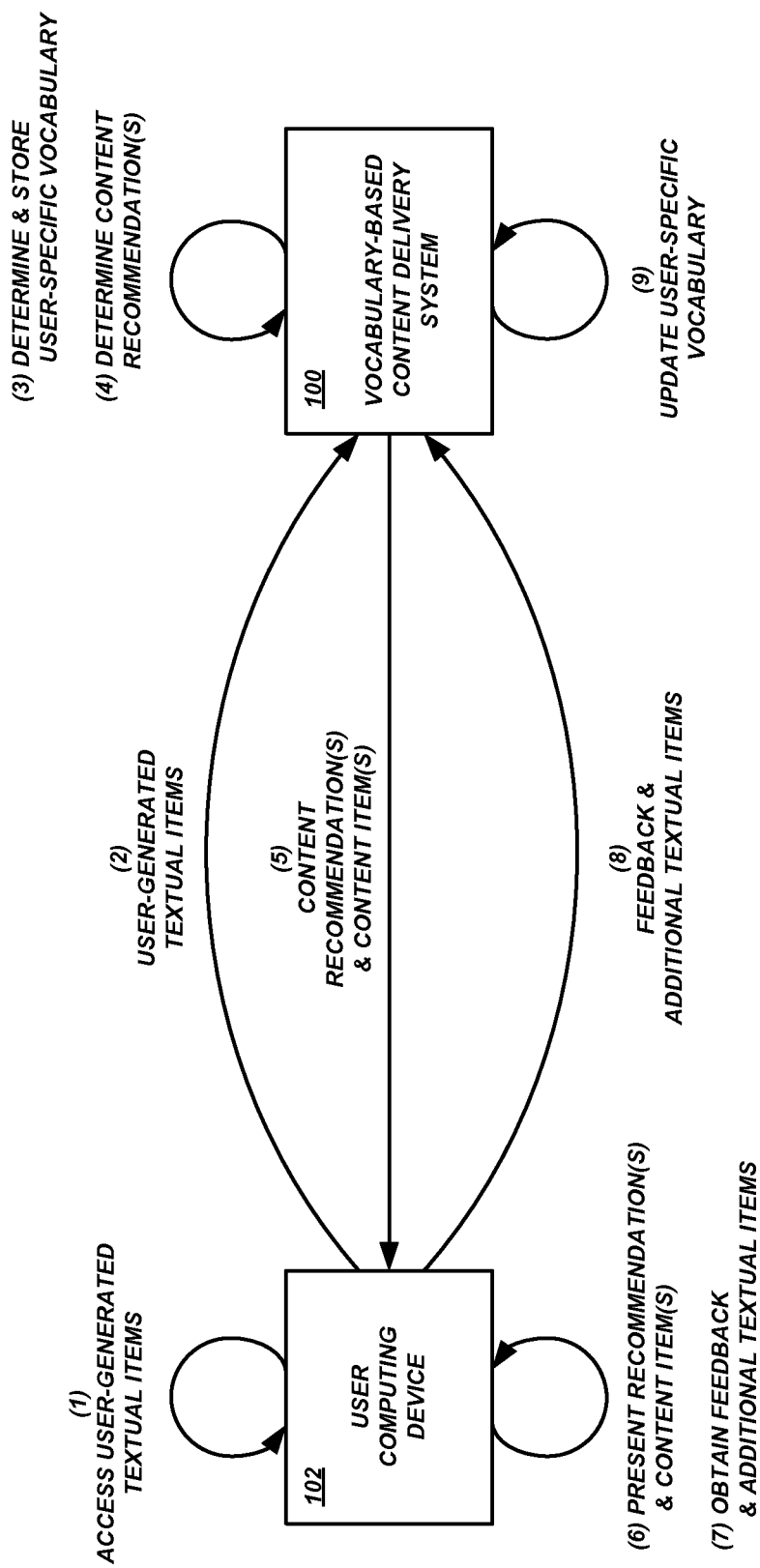
FIG. 2 is a block diagram of illustrative interactions and data flows between a user computing device and a vocabulary-based content delivery system according to some embodiments.

FIG. 2 shows example interactions and data flows between a user device 102 and a content delivery system 100. Illustratively, the content delivery system 100 may obtain user-generated textual items from the user computing device 102 and determine a user-specific vocabulary for a user. The user-specific vocabulary can then be used to recommend or otherwise determine the appropriateness of individual content items for the user based on a degree to which the user's vocabulary covers the words in the content items.

Figure 4:
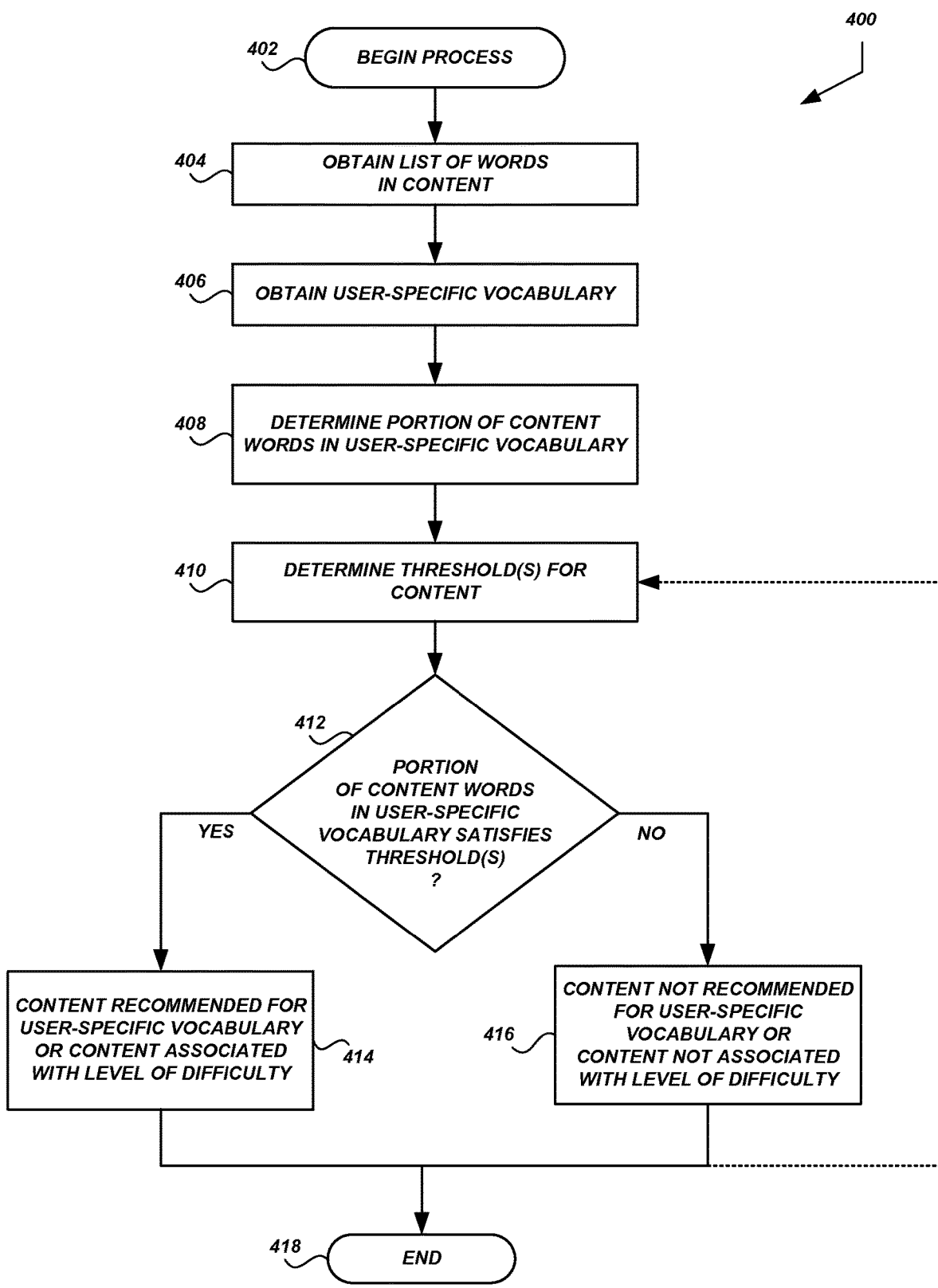
FIG. 4 is a flow diagram of an illustrative process for determining a content recommendation using a user-specific vocabulary according to some embodiments.

As shown in FIG. 2, user-generated textual items may be accessed at the user computing device 102 at (1). In some embodiments, an application provided by or otherwise associated with the content delivery system 100 may execute on the user computing device and access user-generated textual items. Illustratively, the application may be configured to only access information for which it has obtained authorization from the user. The application can request and obtain authorization to access textual communications stored on the user computing device 102, such as text messages, emails, and the like. The application may obtain all user-generated textual items created after a certain data or within a certain date range, or the n most-recent user-generated textual items (where n is some positive integer). Different dates or values for n may be used for different types of textual items (e.g., emails vs. word processing documents), or no distinction may be made between different types of textual items. Once obtained, the user-generated textual items may be transmitted to the content delivery system 100 at (2). One example process for obtaining user-generated textual items is shown in FIG. 4 and described in greater detail below.

Figure 3:
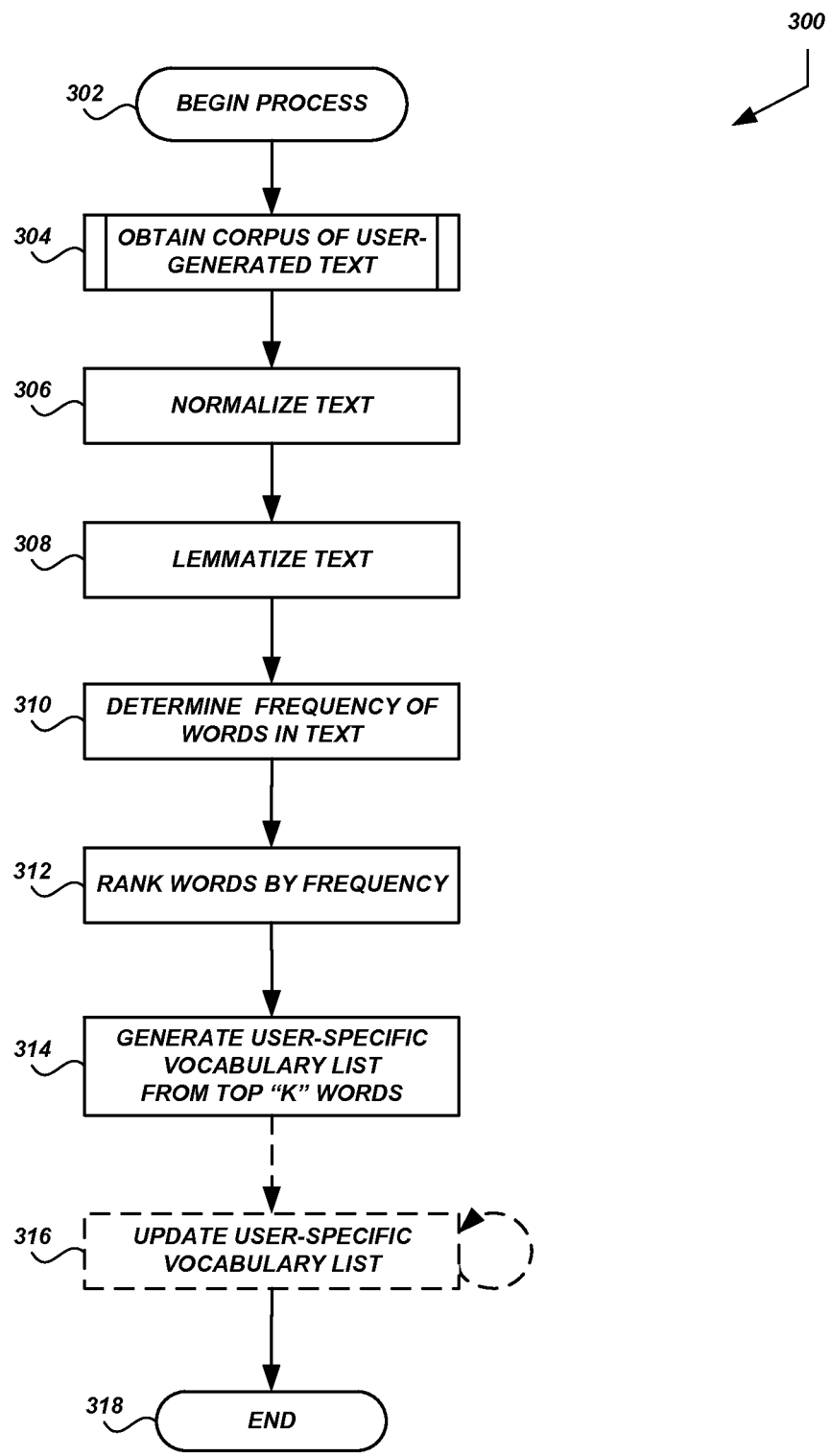
FIG. 3 is a flow diagram of an illustrative process for determining a user-specific vocabulary according to some embodiments.

At (3), the content delivery system 100 can determine and store user-specific vocabulary data for the user. In some embodiments, the content delivery system 100 can process the user-specific textual items (e.g., normalize, lemmatize, etc.) and identify the top k most frequently-used words, where k is some predetermined or dynamically determined value, such as a positive integer, a percentage, etc. One example process for determining a user-specific vocabulary is shown in FIG. 3 and described in greater detail below.

At (4), the content delivery system 100 can determine recommendations for content items based on the vocabulary of the user of the user computing device 102. In some embodiments, the recommendations may be generated in response to a request, such as a request from the user computing device 102 as the user is browsing content, or at the initiation of the content delivery system 100, etc. At (5), the content delivery system 100 can provide, to the user computing device 102, a notification or other communication that recommends content. The content delivery system 100 may also or alternatively provide the content itself to the user computing device 102 (e.g., if the user accepts or otherwise interacts with the recommendation). The process shown in FIG. 4 and described in greater detail below includes one example method of determining recommendations for content items based on a user-specific vocabulary.

At (6), the user computing device 102 can present the recommendations and/or content items. For example, a content item may be an electronic book that has been recommended for the user of the user computing device 102 based on the user's vocabulary. As another example, the content item may be an electronic book that the user selected based on information regarding its appropriateness for the user's vocabulary. As will be appreciated, these examples are illustrative only, and are not intended to be limiting. In some embodiments, the content item may be some other type of content, such a different type of textual content item, an audio book, multimedia presentation, etc.

At (7), feedback and/or additional user-generated textual items may be obtained from the user and/or user computing device 102. In some embodiments, the feedback may be obtained in the form of a questionnaire, quiz, or other solicitation initiated by the content delivery system 100 and/or application executing on the user computing device 100. For example, the user may provide feedback indicating whether the content item was too easy, too difficult, or appropriate for the user's current vocabulary. As another example, the user may answer questions about the user's understanding of the content item. As yet another example, user-generated textual items (e.g., text messages, emails, etc.) that have been generated since the last set of user-generated textual items was collected may be obtained. At (8), the feedback and/or additional user-generated textual items can be transmitted to the content delivery system 100, and the content delivery system 100 may update the user's vocabulary at (9). The process shown in FIG. 3 and described in greater detail below includes one example method of updating user-specific vocabularies.

Example Process for Determining User-Specific Vocabularies

FIG. 3 shows an illustrative process 300 for determining a user-specific vocabulary based on textual items generated by the user. The process 300 begins at block 302. The process 300 may be embodied in a set of executable program instructions stored on a non-transitory computer-readable medium, such as one or more disk drives, of a computing system associated with the content delivery system 100, such as the computing system 600 shown in FIG. 6 and described in greater detail below. When the process 300 is initiated, the executable program instructions can be loaded into memory, such as RAM, and executed by one or more processors of the computing system.

Figure 5:
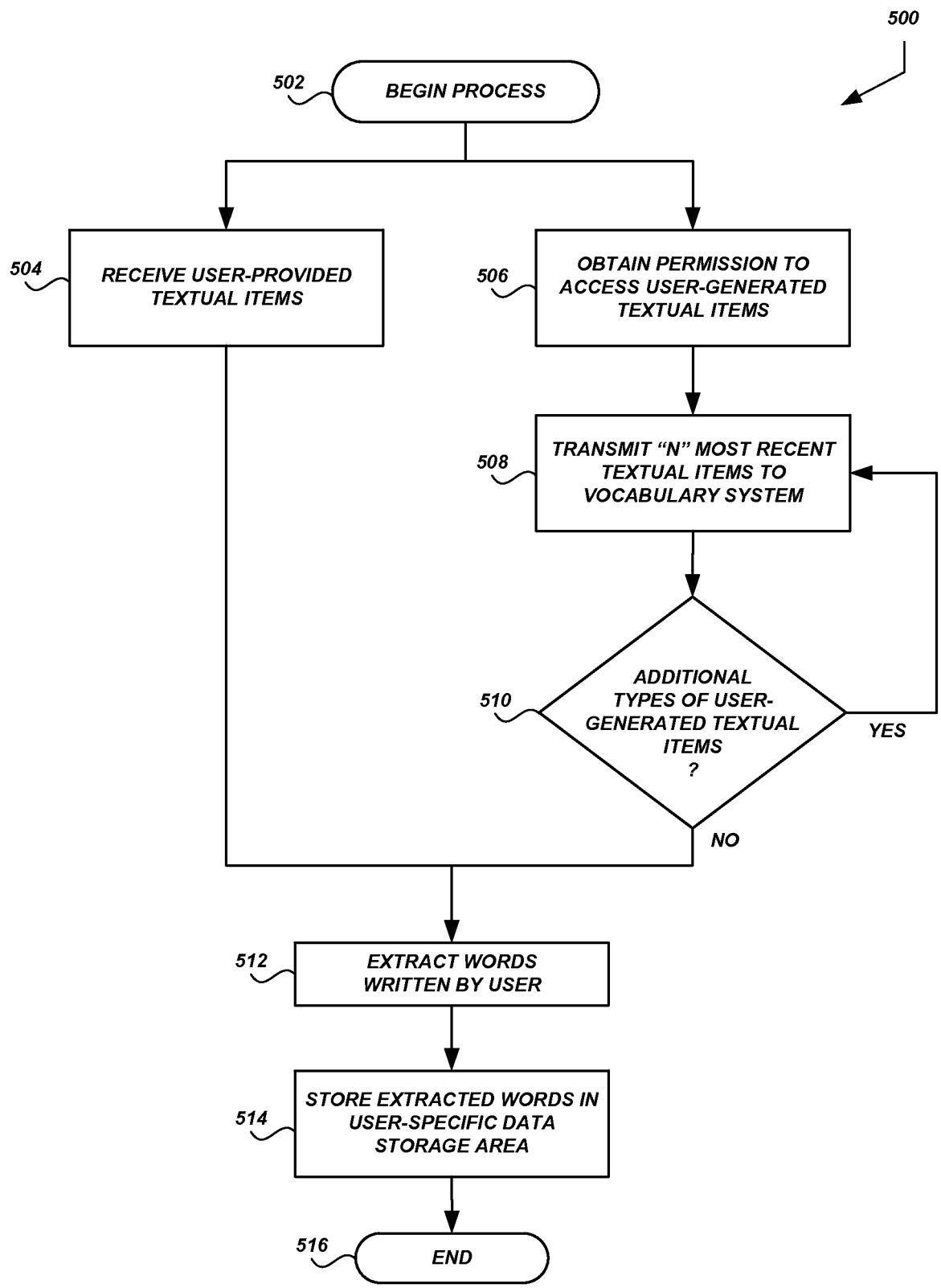
FIG. 5 is a flow diagram of an illustrative process for obtaining a corpus of user-generated text according to some embodiments.

At block 304, the text processing module 110 or some other module or component of the content delivery system 100 can obtain a corpus of text generated by the specific user for whom a vocabulary is to be determined. FIG. 5 shows a sample process 500, described in greater detail below, for obtaining a corpus of user-generated text.

At block 306, the text processing module 110 or some other module or component of the content delivery system 100 can normalize the corpus of user-generated text. Normalization of the corpus of user-generated text generally refers to the process of correcting errors and modifying words into standard forms that can be processed in a consistent manner during subsequent elements of the process 300, regardless of which user generated the text, the errors and idiosyncrasies introduced by that user, etc. Normalizing a corpus of user-generated text may include removing punctuation and adjusting capitalization such that the corpus is a collection of words rather than sentences. Normalization may also include removing proper nouns and words from languages other than the language for which the vocabulary is being created (e.g., removing Spanish words when generating an English language vocabulary list), correcting misspelled words, removing misspelled words, etc. Normalization may further include expanding contractions and abbreviations of words or phrases, and other short-hand. For example, the word "don't" may be expanded by replacing it with two separate words "do" and "not." As another example, the abbreviation "omw" may be expanded by replacing it with three separate words: "on," "my," and "way."

In some embodiments, expansion of colloquial abbreviations or shorthand may be conditional, depending upon the type of user-generated text from which it was extracted. For example, such abbreviations may be expanded if extracted from text messages, but may not be expanded if extracted from word processing documents (in which case such abbreviations may be treated as misspelled words or ignored altogether). In some embodiments, normalization may be customized based on user-specific settings. For example, abbreviations and shorthand may be deleted or ignored for some users (e.g., abbreviation of certain words or phrases may be removed from the corpus of text without being replaced by the words or phrases), but may be expanded or conditionally expanded for other users.

At block 308, the text processing module 110 or some other module or component of the content delivery system 100 can lemmatize the normalized text generated above (or the raw, un-normalized corpus of user-generated text). Generally described, lemmatization is a process of grouping together different inflected forms of a word so they can be treated as a single item. For example, different inflected forms of a lemma may each be treated as an instance of the lemma rather than an instance of a separate word corresponding to one of the inflected forms. Thus, the words "walk," "walked," "walks," and "walking" may each appear in the corpus of user-generated text and may each be replaced by or otherwise counted as four instances of the lemma "walk" rather than a single instance of each of "walk," "walked," "walks," and "walking." In some embodiments, lemmatizing text, which may also be referred to as "stemming" text, may include using an algorithm such as the Lovins stemmer, Porter stemmer, or Paice stemmer to identify the lemma that corresponds to the various inflected forms of the lemma used in the user-generated text. Those inflected forms may then be replaced by the lemma, or tagged such that the lemma can be used during the subsequent frequency/usage determination process At block 310, the vocabulary determination module 112 or some other module or component of the content delivery system 100 can determine the frequency of individual words in the lemmatized (or normalized or un-processed) corpus of user-generated text. In some embodiments, each instance of a word may be counted, and a separate counter may be maintained for each word used on the corpus. This can produce a list of unique words and/or lemmas and corresponding number of times each unique word (and/or lemma) appears in the corpus of text. Thus, frequency in this case may refer to the total number of times an individual word (or all instances of a lemma) was used in the entire corpus of text, or to the ratio of the total number of times an individual word (or all instances of a lemma) was used with respect to the total number of words (or lemmas) in the corpus of text. In some embodiments, the words in the corpus of user-generated text may be associated with an indicator of the specific user-generated textual item from which the words were extracted. In such cases, the number of unique user-generated textual items in which a particular word appears may be counted. This can produce a list of unique words and corresponding number of user-generated textual items in which the word appears. Thus, the frequency in this case may refer to the total number of user-generated textual items in which an individual word (or all instances of a lemma) was used, or to the ratio of the total number user-generated textual items an individual word (or all instances of a lemma) was used with respect to the total number of user-generated textual items in the corpus of text. In some embodiments, other methods of determining the frequency of words in the corpus of text may be used, such as the number of sentences in which a given word is used, the number of paragraphs in which a given word is used, the number of user-generated textual items in which a given word is used at least a threshold number of times, etc.

The examples described above are illustrative only, and are not intended to be limiting. In some embodiments, other methods of determining word frequency may be used. Illustratively, a weighting factor may be associated with individual types of user-generated textual items. Thus, instances of words in some types of user-generated texts may be given more weight in the frequency determination (and, accordingly, in the resulting vocabulary determination below) than other words. For example, correct usage of a word in a book review may be more indicative that the user knows the meaning of the word than usage of a word in text message. By giving more weight to usage of the word in a book review, a score may be generated that is reflective of a user's knowledge of the word, rather than a frequency of word use. In this example, text messages may have a relatively low weighting factor of x due to the informal nature of the writing and/or the length constraints on the writing, while book reviews may have a relatively higher weighting factor of y because such items may tend to be longer and/or demonstrate a higher degree formal understanding. The score or weighted frequency for a particular word may be calculated as the frequency of use of the word in text messages multiplied by weighting factor x, added to the frequency of use of the word in book reviews multiplied by weighting factor y. More generally, a score or weighted frequency may be calculated as frequency1*weight1+ frequency2*weight 2+ . . . +frequencyn*weightn=final score for a given word. The weighting factors may be predetermined values determined based on prior observations, heuristics, etc.

At block 312, the vocabulary determination module 112 or some other module or component of the content delivery system 100 can rank individual words by frequency. In some embodiments, the ranking may be performed by sorting the listing of words and corresponding frequencies (and/or scores) in ascending or descending order.

At block 314, the vocabulary determination module 112 or some other module or component of the content delivery system 100 can generate a user-specific vocabulary list from the ranked word list generated above. In some embodiments, the user-specific vocabulary list may include the top k most frequently used words (or highest scoring words). For example, k may be a predetermined or dynamically determined integer, such as 1,000. As another example, k may correspond to the number of words with frequencies (or scores) exceeding some threshold. The threshold may be a static number, such as 10 (e.g., each word used more than 10 times in textual items generated by the user in the past month may be included in the user's vocabulary), or it may be a percentile, such as 50 (e.g., every word with a corresponding frequency at or above the $50^{th}$ percentile of all words in the corpus of text). In some embodiments, the threshold may be determined such that words with frequencies meeting the threshold are associated with an average or expected degree of understanding. In other embodiments, a feedback loop may be used. For example, a user may be quizzed about the meanings of words that have frequencies meeting the threshold. If the user does not demonstrate an expected degree of understanding with respect to those words, then the threshold may be adjusted such that only words with higher frequencies satisfy the threshold. If a user demonstrates an exceptionally high degree of understanding for words satisfying the threshold, then the threshold may be lowered to capture additional words that the user may also know well. Other methods of threshold determination and/or adjustment may be used.

The user-specific vocabulary list can be stored for use by other processes, modules, and/or components. For example, the user-specific vocabulary list may be stored, in connection with user-identifying information, as a data structure of words and, optionally, corresponding frequencies.

At block 316, the vocabulary determination module 112 or some other module or component of the content delivery system 100 can optionally update the user-specific vocabulary list on an ad-hoc or regular basis, or in response to the occurrence of some event. In some embodiments, after reading or otherwise consuming content, users may be quizzed regarding their comprehension of the content item. The user's vocabulary can then be updated to include some or all words in the content item based on the user's feedback. Alternative, or in addition, words appearing in content consumed by a user may be added to the user's vocabulary list if they were not previously in the user's vocabulary.

At block 318, the process can terminate.

Example Process for Determining User-Specific Degree of Comprehension Difficulty FIG. 4 shows an illustrative process 400 for determining a user-specific degree of comprehension difficulty for a content item based on a user-specific vocabulary, such as a vocabulary list generated using the process 300 described above. The process 400 begins at block 402. The process 400 may be embodied in a set of executable program instructions stored on a non-transitory computer-readable medium, such as one or more disk drives, of a computing system associated with the content delivery system 100, such as the computing system 600 shown in FIG. 6 and described in greater detail below. When the process 400 is initiated, the executable program instructions can be loaded into memory, such as RAM, and executed by one or more processors of the computing system.

At block 404, the content recommendation module 114 or some other module or component of the content delivery system 100 can obtain a list of words in a content item for which a user-specific degree of comprehension difficulty is to be determined. Illustratively, the content item may be an electronic book or article, which may serve as its own list of words. In some embodiments, the content item may be an audio book, video, multimedia presentation, or the like. In such cases, a separate list of words may be accessed or generated.

At block 406, the content recommendation module 114 or some other module or component of the content delivery system 100 can obtain a user-specific vocabulary list of words uniquely associated with the user for whom the user-specific degree of comprehension difficulty is being determined. For example, the content recommendation module 114 may use a unique user identifier to obtain the user-specific vocabulary list of words from the user-specific vocabularies data store 116.

At block 408, the content recommendation module 114 or some other module or component of the content delivery system 100 can determine the portion (e.g., number or percentage) of words in the content item that are also in the user-specific vocabulary list of words. In some embodiments, the determination may be made by counting the unique words in the content item that are also in the user-specific vocabulary list (e.g., "the" is only counted once, for the first instance of "the" in the content item, even though there may be dozens, hundreds, or more instances of the word "the" in the content item). The number may be divided by the total number of unique words in the content item to give a percentage of unique words in the content item that are in the user's vocabulary. In other embodiments, the number or percentage may be based on the all words in the content item, including duplicates (e.g., each instance of "the" is counted separately such that a vocabulary including the word "the" is determined to include dozens, hundreds, or more words in the content item by virtue of including only the word "the" in the vocabulary list).

At block 410, the content recommendation module 114 or some other module or component of the content delivery system 100 can determine one or more thresholds for the content item. In some embodiments, a recommendation threshold may be determined. The recommendation threshold may correspond to the degree to which a user's vocabulary includes the words in the content item in order for the content delivery system 100 to recommend the content to the user or to otherwise determine that the content is likely to be understood by the user. The recommendation threshold may be a pre-determined threshold (e.g., 70% coverage of words in a content item by a vocabulary word list) or it may be dynamically determined or customized. As an example of the latter, an observed or expected learning curve may be used to adjust the threshold over time for a particular user or all users. In other embodiments, two or more thresholds may be determined such that different ranges of comprehension difficulty can be identified. For example, if two different thresholds are determined and a vocabulary covers less than the lower threshold amount of words in a content item, the content item may be labeled as too difficult for the user. If the vocabulary covers more than the higher threshold amount of words in the content item, then the content item may be labeled as too easy for the user. If the vocabulary covers an amount between the lower and higher thresholds, then the content may be labelled as appropriate for the user. In some embodiments, the threshold(s) may be determined dynamically or on a customized user-by-user basis. For example, if a user typically gives positive feedback to content items that have been determined to be too difficult for the user, then the threshold may be adjusted in the future accordingly. In some embodiments, a threshold may be set by a user. For example, a user may use a configuration setting to indicate that only content items with at least 75% of words covered by the user's vocabulary are recommended to the user.

At decision block 412, the content recommendation module 114 or some other module or component of the content delivery system 100 can compare the vocabulary's coverage of words in the content item, determined above at block 408, to the threshold(s) determined above at block 410. For example, if the threshold is a recommendation threshold, then the vocabulary's coverage determined above may be compared to the recommendation threshold. If the coverage is greater than the threshold, the process 400 may proceed to block 414, where the content is recommended (e.g., a recommendation is transmitted to the user's computing device for display). If the coverage is less than the threshold, the process 400 may proceed to block 416, where the content is not recommended (e.g., a recommendation is not transmitted to the user's computing device for display, or the process 400 is repeated for another content item until a content item that passes the threshold is found).

In some embodiments, rather than (or in addition to) determining whether to recommend or not recommend a content item, the content delivery system 100 may associate a user-specific degree of difficulty with the content item. For example, if a user's vocabulary coverage of words in a content item is within a first range (e.g., between a first pair of thresholds, or above/below a first threshold), then a first degree of difficulty may be associated with the content item (e.g., for high coverage of words in a content item, a low degree of difficulty may be assigned). If a user's vocabulary coverage of words in the content item falls in a second range (e.g., between a second pair of thresholds, or above/below a second threshold), then a second degree of difficulty may be associated with the content item (e.g., for lower coverage of words in a content item, a higher degree of difficulty may be assigned). If a user's vocabulary coverage of words in a content item does not fall within one range, the process 400 may return to block 410 to determine thresholds for a different range. Any number of different degrees of difficulty may be used, and the thresholds may be predetermined or dynamically determined.

Example Process for Obtaining User-Generated Textual Items

FIG. 5 shows an illustrative process 500 for obtaining user-generated textual items for use in determining a user-specific vocabulary (e.g., using the process 300 described above). The process 500 begins at block 502. The process 500 may be embodied in a set of executable program instructions stored on a non-transitory computer-readable medium, such as one or more disk drives, of a computing system associated with the content delivery system 100, such as the computing system 600 shown in FIG. 6 and described in greater detail below. When the process 500 is initiated, the executable program instructions can be loaded into memory, such as RAM, and executed by one or more processors of the computing system.

At block 504, the text processing module 110 or some other module or component of the content delivery system 100 can receive user-provided textual items. For example, a user may select particular files to be analyzed in determining the user's vocabulary, and may upload those files to the content delivery system 100. Illustratively, the files may include school papers, non-confidential documents created at work, etc. By allowing a user to actively select which files to provide for use in determining the user's vocabulary, the user can have greater control over the information used to determine the user's personal vocabulary, while still obtaining the benefit of automatic vocabulary determination without actively participating in vocabulary tests.

At block 506, alternatively or in addition to the user-initiated upload of files described above with respect to block 504, an application executing on the user's device 102 or accessing an API on the user's device 102 may obtain permission to access user-generated textual items. For example, the application may generate a prompt to solicit access to the user's text messages, emails, microblog posts, network searches, etc. Once authorization to access user-generated textual items is obtained, the process 500 may proceed to block 508. Otherwise, if authorization is not obtained, the process 500 may terminate at block 516.

At block 508, the application may access the n most recent user-generated textual items and transmit them to the content delivery system 100. In some embodiments, n may correspond to a number of items to be transmitted. In other embodiments, n may correspond to a ratio or percentage of items to be transmitted. In further embodiments, no specific number is used. Instead, all or substantially all of the user-generated textual items that were generated in a particular timeframe may be transmitted to the content delivery system 100.

At decision block 510, the application may determine whether there are additional types of user-generated textual items to obtain and transmit to the content delivery system 100. If so, the process 500 may return to block 508. For example, a different value of n may and/or different date ranges may be used for different types of user-generated textual items (e.g., a first value $n_1$ may be used for emails, a second different value of $n_2$ may be used for social network posts, etc.).

In some embodiments, additional (or alternative) data sources may be used to obtain words known to the user. For example, a user may play a game or otherwise interact with an application on a mobile phone. In the game, the user may demonstrate knowledge of particular words without necessarily typing, selecting, or otherwise entering the words. Information may be obtained from such games for use in generating the user-specific vocabulary. As another example, a user may interact with an application (or with a separate computing device altogether) through spoken utterances, and the utterances may be transcribed into textual representations of the utterances. Such transcriptions can provide additional evidence of the user's vocabulary, and may therefore be obtained and provided to the content delivery system 100 as described below.

At block 512, the text processing module 110 or some other module or component of the content delivery system 100 may extract, from the user-generated textual items, the words that are likely to have been typed, entered, selected, or otherwise used by the user. In some embodiments, the process of extracting words likely to be used by the user may a subtractive process by which words and other information that is unlikely to have been used by the user are removed. For example, headers and other textual metadata regarding textual communications may be removed or excluded; the text of messages from other users to which the current user has responded (and which have been copied into the user's own messages, as is common in many email systems) may be removed or excluded; etc. In some embodiments, the process of extracting words likely to be used by the user may be an additive process by which the user-generated textual items are analyzed to identify likely user-entered text. For example, a machine learning model may be generated and used to identify and isolate user-entered text in the user-generated textual items. The identified text may then be added to a corpus of text that includes only, or primarily, words likely to have been entered or otherwise used by the user.

At block 514, the text processing module 110 or some other module or component of the content delivery system 100 may store the words likely to have been entered or otherwise used by the as a corpus of text likely to have been used by the user. The corpus of text may serve as an input to other process and or functions, such as the process 300 described in greater detail above.

Execution Environment

Figure 6:
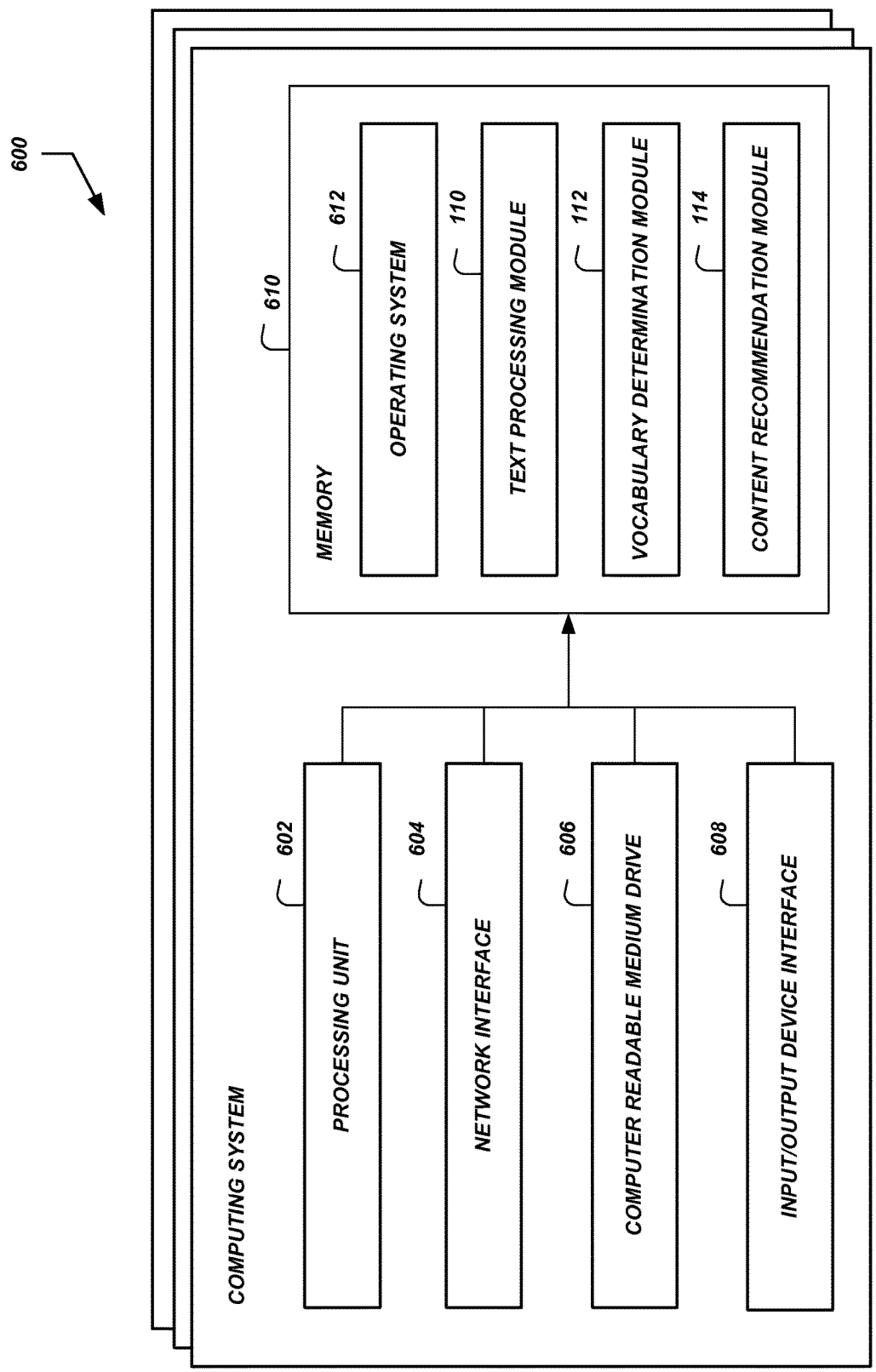
FIG. 6 is a block diagram of an illustrative computing system configured to implement vocabulary determination and vocabulary-based recommendations according to some embodiments.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 includes a text processing module 110 that performs some or all of the operations described above with respect to processes 300 and 500, a vocabulary determination module 112 that performs some or all of the operations described above with respect to process 300, and a content recommendation module 114 that performs some or all of the operations described above with respect to process 400. In such cases, the computing system 600 may, alone or in combination with other computing systems, perform some or all of the functions of the vocabulary-based content delivery system 100 described herein. For example, multiple computing systems 600 may communicate with each other via their respective network interfaces 604, and can implement user-specific vocabulary determination and vocabulary-based content recommendation individually (e.g., each computing system 600 may execute one or more separate instances of the processes 300, 400, and/or 400), in parallel (e.g., each computing system 600 may execute a portion of a single instance of a process 300, 400, and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method for vocabulary-based content recommendation, the computer-implemented method comprising:
under control of one or more computing devices configured with specific computer-executable instructions,
obtaining a corpus of text associated with a user, the corpus of text comprising text previously generated for communication from a user computing device of the user;
selecting, from the corpus of text, individual words to generate a vocabulary list of words, wherein individual words of the corpus of text are selected based at least partly on a number of times the individual words appear in the corpus of text;
determining a degree of comprehension difficulty for a content item based at least partly on the vocabulary list of words, wherein the degree of comprehension difficulty is determined using a quantity of different words, in the text previously generated for communication from the user computing device, also occurring in the content item;

analyzing the degree of comprehension difficulty with respect to one or more thresholds;

determining, based at least partly on results of analyzing the degree of comprehension difficulty with respect to the one or more thresholds, to transmit information regarding the content item to the user computing device; and transmitting the information regarding the content item to the user computing device.

2. The computer-implemented method of claim 1, wherein the content item comprises an electronic book, an audio book, a printed textual content item, a video, or a multimedia presentation.

3. The computer-implemented method of claim 1, wherein determining the degree of comprehension difficulty comprises comparing individual words of the vocabulary list of words to individual words in a list of words in the content item to determine at least one of: a number unique words in the content item that are also in the vocabulary list of words; a number of all words in the content item that are also in the vocabulary list of words; a percentage of words in the content item that are also in the vocabulary list of words; or a percentage of unique words in the content item that are also in the vocabulary list of words.

4. The computer-implemented method of claim 1, wherein selecting the individual words to generate the vocabulary list of words comprises determining, for a first word in the corpus of text, that the number of times the first word appears in the corpus of text exceeds a threshold, wherein the threshold corresponds a number of word usage indicative of word understanding.

5. The computer-implemented method of claim 1, further comprising determining a weighted score for individual words in the corpus of text, wherein instances of words associated with a first type of user-generated textual item are weighted more heavily than instances of words associated with a second type of user-generated textual item, and wherein selecting individual words from the corpus of text to generate the vocabulary list of words is based at least partly on the weighted scores.

6. The computer-implemented method of claim 1, further comprising replacing inflected forms of a base word in the corpus of text with the base word prior to selecting the vocabulary list of words.

7. The computer-implemented method of claim 1, wherein the degree of comprehension difficulty represents at least one of: a number unique words in the content item that are also in the vocabulary list of words; a number of all words in the content item that are also in the vocabulary list of words; a percentage of words in the content item that are also in the vocabulary list of words; or a percentage of unique words in the content item that are also in the vocabulary list of words.

8. The computer-implemented method of claim 1, wherein obtaining the corpus of text comprises transmitting, to the user computing device, an executable application configured to:

access a plurality of textual communications stored on the user computing device; and provide the plurality of textual communications to the one or more computing devices.

9. The computer-implemented method of claim 1, wherein the corpus of text further comprises: text generated during user interaction with a game, text generated by an application without the user entering the text, or transcriptions of spoken user interactions with a computing system separate from the user computing device.

10. One or more non-transitory computer readable media comprising executable code that, when executed, cause one or more computing devices to perform a process comprising:

obtaining a corpus of text associated with a user, the corpus of text comprising text previously generated for communication from a user computing device of the user;

selecting, from the corpus of text, individual words to generate a vocabulary list of words, wherein individual words of the corpus of text are selected based at least partly on a number of times the individual words appear in the corpus of text;

determining a degree of comprehension difficulty for a content item based at least partly on the vocabulary list of words, wherein the degree of comprehension difficulty is determined using a quantity of different of words, in the text previously generated for communication from the user computing device, also occurring in the content item;

analyzing the degree of comprehension difficulty with respect to one or more thresholds;

determining, based at least partly on results of analyzing the degree of comprehension difficulty with respect to the one or more thresholds, to transmit information regarding the content item to the user computing device; and transmitting the information regarding the content item to the user computing device.

11. The one or more non-transitory computer readable media of claim 10, wherein determining the degree of comprehension difficulty comprises comparing individual words of the vocabulary list of words to individual words in a list of words in the content item to determine at least one of: a number unique words in the content item that are also in the vocabulary list of words; a number of all words in the content item that are also in the vocabulary list of words; a percentage of words in the content item that are also in the vocabulary list of words; or a percentage of unique words in the content item that are also in the vocabulary list of words.

12. The one or more non-transitory computer readable media of claim 10, further comprising an executable application configured to cause the user computing device to at least:

access a plurality of textual communications stored on the user computing device; and provide the plurality of textual communications to the one or more computing devices.

13. A system comprising:

a computer-readable memory storing executable instructions; and one or more computing devices in communication with the computer-readable memory, wherein the one or more computing devices are programmed by the executable instructions to at least:

obtain a corpus of text associated with a user, the corpus of text comprising text previously generated for communication from a user computing device of the user;

select, from the corpus of text, individual words to generate a vocabulary list of words, wherein individual words of the corpus of text are selected based at least partly on a number of times the individual words appear in the corpus of text;

determine a degree of comprehension difficulty for a content item based at least partly on the vocabulary list of words, wherein the degree of comprehension difficulty is determined using a quantity of different words, in the text previously generated for communication from the user computing device, also occurring in the content item;

analyze the degree of comprehension difficulty with respect to one or more thresholds;

determine, based at least partly on results of analyzing the degree of comprehension difficulty with respect to the one or more thresholds, to recommend the content item; and transmit a recommendation of the content item to the user computing device.

14. The system of claim 13, wherein the executable instructions to determine the degree of comprehension difficulty comprise executable instructions to at least compare individual words of the vocabulary list of words to individual words in a list of words in the content item.

15. The system of claim 13, wherein the executable instructions to obtain the corpus of text comprise executable instructions to at least transmit, to the user computing device, an executable application configured to:

access a plurality of textual communications stored on the user computing device; and provide the plurality of textual communications to the one or more computing devices.

16. The system of claim 13, wherein one or more computing devices are further programmed by the executable instructions to at least determine a weighted score for individual words in the corpus of text, wherein instances of words associated with a first type of user-generated textual item are weighted more heavily than instances of words associated with a second type of user-generated textual item, and wherein selecting individual words from the corpus of text to generate the vocabulary list of words is based at least partly on the weighted scores.

17. The computer-implemented method of claim 1, wherein the analyzing the degree of comprehension difficulty with respect to one or more thresholds comprises comparing the degree of comprehension difficulty to a recommendation threshold.

18. The computer-implemented method of claim 17, further comprising:

obtaining feedback regarding one or more content items previously transmitted to the user computing device; and determining the recommendation threshold based at least on the feedback.

19. The system of claim 13, wherein the one or more computing devices are further programmed by the executable instructions to at least:

determine a modification to a recommendation threshold based at least partly on feedback regarding one or more content items previously transmitted to the user computing device; and determine a threshold of the one or more thresholds using the modification to the recommendation threshold.

20. The computer-implemented method of claim 1, further comprising determining a dynamic threshold based at least partly on an expected learning rate associated with the user, wherein the one or more thresholds include the dynamic threshold.

21. The system of claim 13, wherein the one or more computing devices are further programmed by the executable instructions to at least determine a genre-specific threshold based at least partly on a level of interest of the user in content items in a particular genre, wherein the one or more thresholds include the genre-specific threshold.

* * * * *

UNITED STATES PATENT AND TRADEMARK OFFICE
CERTIFICATE OF CORRECTION

PATENT NO. : 10,902,197 B1  
APPLICATION NO. : 14/673627  
DATED : January 26, 2021  
INVENTOR(S) : Geetika Tewari Lakshmanan Page 1 of 1

It is certified that error appears in the above-identified patent and that said Letters Patent is hereby corrected as shown below:

In the Specification

In Column 8, Line 46, delete "process" and insert --process.--.

In Column 13, Line 61, delete "and or" and insert --and/or--.

In Column 14, Line 5, delete "("SDDs")," and insert --("SSDs"),--.

In the Claims

In Column 17, Line 18, Claim 3, after "number" insert --of--.

In Column 17, Line 30, Claim 4, after "corresponds" insert --to--.

In Column 17, Line 47, Claim 7, after "number" insert --of--.

In Column 18, Line 16, Claim 10, after "different" delete "of".

In Column 18, Line 34, Claim 11, after "number" insert --of--.

Signed and Sealed this  
Sixth Day of April, 2021

Drew Hirshfeld  
*Performing the Functions and Duties of the  
Under Secretary of Commerce for Intellectual Property and  
Director of the United States Patent and Trademark Office*